United States Patent
Dimitrovski et al.

(10) Patent No.: US 11,785,570 B2
(45) Date of Patent: Oct. 10, 2023

(54) METHOD OF, AND DEVICES FOR, ESTABLISHING A SIGNALLING CONNECTION BETWEEN A REMOTE USER EQUIPMENT, UE, AND A TELECOMMUNICATION NETWORK VIA A RELAY CAPABLE UE

(71) Applicants: Koninklijke KPN N.V., Rotterdam (NL); Nederlandse Organisatie Voor Toegepast-Natuurwetenschappelijk Onderzoek TNO, The Hague (NL)

(72) Inventors: Toni Dimitrovski, The Hague (NL); Antonius Norp, The Hague (NL); Erwin Willem Middelesch, The Hague (NL)

(73) Assignees: KONINKLIJKE KPN N.V., Rotterdam (NL); NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 16/769,520

(22) PCT Filed: Dec. 17, 2018

(86) PCT No.: PCT/EP2018/085172
§ 371 (c)(1),
(2) Date: Jun. 3, 2020

(87) PCT Pub. No.: WO2019/121497
PCT Pub. Date: Jun. 27, 2019

(65) Prior Publication Data
US 2021/0195550 A1 Jun. 24, 2021

(30) Foreign Application Priority Data
Dec. 18, 2017 (EP) .................................... 17207899

(51) Int. Cl.
*H04W 60/04* (2009.01)
*H04W 76/11* (2018.01)
(Continued)

(52) U.S. Cl.
CPC ............. *H04W 60/04* (2013.01); *H04W 8/08* (2013.01); *H04W 76/11* (2018.02); *H04W 88/04* (2013.01)

(58) Field of Classification Search
CPC ....... H04W 60/04; H04W 76/11; H04W 8/08; H04W 88/04
(Continued)

(56) References Cited

U.S. PATENT DOCUMENTS

| 9,380,637 B2 | 6/2016 | Huang | |
|---|---|---|---|
| 2004/0260831 A1* | 12/2004 | Dyck | H04W 28/18 709/233 |

(Continued)

FOREIGN PATENT DOCUMENTS

| TW | 201735715 A | 10/2017 |
|---|---|---|
| WO | 2017052342 A1 | 3/2017 |

(Continued)

OTHER PUBLICATIONS

International Search Report and Written Opinion for Int'l Application No. PCT/EP2018/085172, titled: A Method of, and Devices for, Establishing a Signalling Connection Between a Remote User Equipment, UE, and a Telecommunication Network Via a Relay Capable UE, dated Jan. 17, 2019.

(Continued)

*Primary Examiner* — Nghi H Ly
(74) *Attorney, Agent, or Firm* — Hamilton, Brook, Smith & Reynolds, P.C.

(57) ABSTRACT

A method of establishing a signalling connection between a remote User Equipment, UE, and a telecommunication (Continued)

network via a relay capable UE, wherein said relay capable UE has established user plane connectivity to an intermediate node comprised by said telecommunication network and is arranged for supporting establishment of said connection for said remote UE, said method comprising the steps of receiving a registration message over said user plane forwarded by said relay capable UE and originating from said remote UE for registering said remote UE to said telecommunication network, forwarding said registration message to a Mobility Management Function comprised by said telecommunication network and receiving a registration accept message from said Mobility Management Function for accepting registration of said remote UE to said telecommunication network, and forwarding said registration accept message to said remote UE via said relay capable UE.

11 Claims, 4 Drawing Sheets

(51) Int. Cl.
*H04W 8/08* (2009.01)
*H04W 88/04* (2009.01)

(58) Field of Classification Search
USPC .............. 370/329, 328, 338, 341, 345, 350
See application file for complete search history.

(56) References Cited

U.S. PATENT DOCUMENTS

| | | | |
|---|---|---|---|
| 2009/0052396 A1* | 2/2009 | Bucker | H04W 36/0038 370/331 |
| 2011/0246758 A1 | 10/2011 | Lu et al. | |
| 2016/0360563 A1* | 12/2016 | Lecroart | H04L 69/322 |
| 2017/0302360 A1 | 10/2017 | Aminaka | |
| 2019/0110238 A1* | 4/2019 | Buckley | H04W 88/04 |

FOREIGN PATENT DOCUMENTS

| | | |
|---|---|---|
| WO | WO 2017/099833 A1 | 6/2017 |
| WO | WO 2019/121497 A1 | 6/2019 |

OTHER PUBLICATIONS

European Search Report for European Application No. EP 17 20 7899, titled: A Method of, and Devices for, Establishing a Signalling Connection Between a Remote User Equipment, UE, and a Telecommunication Network Via a Relay Capable UE, dated Mar. 20, 2018.

Extended European Search Report for European Application No. EP 17 20 7899, titled: A Method of, and Devices for, Establishing a Signalling Connection Between a Remote User Equipment, UE, and a Telecommunication Network Via a Relay Capable UE, dated Mar. 29, 2018.

"3rd Generation Partnership Project; Technical Specification Group Services and System Aspects; Proximity-based services (ProSe); Stage 2 (Release 15)," 3GPP Standard; Technical Specification; 3GPP TS 23.303, 3rd Generation Partnership Project (3GPP), Mobile Competence Centre ; Sophia-Antipolis Cedex ; France, vol. SA WG2, No. V15.0.0, Jun. 12, 2017 (Jun. 12, 2017), pp. 1-131, XP051298388.

Coolpad: "Discussion on Control Plane Architecture for Evolved Prose UE-to-NW relay," 3GPP Draft; R2-166590 Discussion on Controlplane Architecture Forevolved Prose UE-to-NW Relay Coolpad_V1, 3rd Generation Partnership Project (3GPP), Mobile Competence Centre; vol. RAN WG2, No. Kaohsiung; Oct. 10, 2016-Oct. 14, 2016, Oct. 9, 2016 (Oct. 9, 2016), XP051151090, Retrieved from the Internet at: URL:http://www.3gpp.org/ftp/Meetings 3GPP, Retrieved from the Internet on: Oct. 9, 2016.

3GPP, Ericsson, "Management of the PC5 link between the Relay UE and the Remote UE," Beijing, P.R. China, 3GPP, TSG-RAN, WG2 #91, (Aug. 15, 2015).

* cited by examiner

METHOD OF, AND DEVICES FOR, ESTABLISHING A SIGNALLING CONNECTION BETWEEN A REMOTE USER EQUIPMENT, UE, AND A TELECOMMUNICATION NETWORK VIA A RELAY CAPABLE UE

This application is the U.S. National Stage of International Application No. PCT/EP2018/085172, filed on Dec. 17, 2018, which designates the U.S., published in English, and claims priority under 35 U.S.C. § 119 or 365(c) to European Application No. 17207899.0, filed on Dec. 18, 2017. The entire teachings of the above applications are incorporated herein by reference.

TECHNICAL FIELD

The present invention is generally related to User Equipment, UE, that are connected to a telecommunication network via a relay capable UE. More specifically, the invention relates to a method of establishing a signalling connection between a remote UE and the telecommunication network via a relay capable UE.

BACKGROUND

Telecommunication networks enable User Equipment, UE, to communicate with each other via one of a number of access nodes and via one or more core networks. Typically, the UEs are mobile terminals like mobile smart phones, tablets, or anything alike. The term UE may also refer to generally stationary communication devices, such as laptops, computers, Internet of Things (IoT) devices or anything alike. In the following description the term User Equipment is used, which is intended to cover any of the above identified use cases.

In the context of the present disclosure, a telecommunication network comprises the access network, for example the Evolved UMTS Terrestrial Radio Access Network (E-UTRAN), as well as the core network, for example the Evolved Packet Core (EPC) network. The access node is typically the node in the access network to which a UE directly communicates, for example the Evolved Node B in 4G telecommunication networks, the gNodeB in 5G telecommunication networks, the radio base station or anything alike.

The last couple of years, proximity-based services, ProSe, have been introduced in the telecommunication network for providing additional functionality for a UE. The features of ProSe comprise ProSe discovery and ProSe Direct Communication.

A ProSe capable UE may perform a ProSe discovery to identify ProSe-enabled UEs in its proximity using the access network and/or the core network. Direct Communication enables the establishment of a direct communication connection between ProSe-enabled UEs that are in direct communication range. The ProSe Direct Communication path could use different radio technologies, for example, E-UTRA or Wi-Fi Neighbourhood Aware Networking (Wi-Fi NAN), or anything alike.

ProSe Direct communication enables the use of a ProSe UE-to-Network relay, which acts as a relay between the access network and a remote UE. The ProSe UE-to-Network relay entity (relay capable UE) thus provides the functionality to support connectivity to the telecommunication network for remote UEs. A UE is considered to be a remote UE for a certain ProSe UE-to-Network relay if it has successfully established a direct communication path to the UE-to-Network relay. A remote UE can be located within, or outside, the coverage area of the access node.

The ProSe UE-to-Network Relay shall relay traffic, uplink as well as downlink, between the remote UE and the telecommunication network. The ProSe UE-to-Network Relay provides generic functions that can relay any Internet Protocol (IP) traffic, packet switched traffic, or other types of packet based transport services. Here, one-to-one Direct Communication is used between remote UEs and the ProSe UE-to-Network Relays for relaying the traffic.

The establishment of a relayed connection can be done using mechanisms for discovery and link setup specified in 3GPP's Proximity Services. However, in order to use these mechanisms, the ProSe Function, as specified in 3GPP TS 23.303, in the network needs to authorize the UE using the service and the network needs to configure and control the use of radio resources for the link between the remote UE and the relay capable UE. Service authorization is performed via a direct access to the network over the PC3 interface. The configuration of radio resources to use is also performed via a direct access over the PC3 interface to the network in case of Public Safety usage when the remote UE is not served by an access network, i.e. when it has no connection to the telecommunication network.

The above implies that the remote UE needs to have had a previous connection to the network before the establishment of the relaying connection, i.e. it needs to already be registered or attached to the telecommunication network. If the remote UE hasn't had any contact with the access network previously, or it doesn't have a connection to the access network, it is currently not possible to establish a relayed connection.

In short, it is presently a drawback that remote UEs need to have, or have had, a previous direct connection to the access network in order to establish the relayed connection via the relay capable UE.

SUMMARY

It is an objective to provide for methods of establishing a signalling connection between a remote UE and a telecommunication network via a relay capable UE.

It is another objective to provide for devices for supporting establishment of a connection between a remote UE and a telecommunication network via a relay capable UE.

In a first aspect there is provided a method of establishing a signalling connection between a remote UE and a telecommunication network via a relay capable UE, wherein said relay capable UE has established user plane connectivity to an intermediate node comprised by said telecommunication network and is arranged for supporting establishment of said connection for said remote UE.

The method comprises the steps of receiving a registration message over said user plane forwarded by said relay capable UE and originating from said remote UE for registering said remote UE to said telecommunication network, forwarding said registration message to a Mobility Management Function comprised by said telecommunication network, receiving a registration accept message from said Mobility Management Function for accepting registration of said remote UE to said telecommunication network, and forwarding said registration accept message to said remote UE via said relay capable UE.

The present disclosure is directed to the introduction of an intermediate node in the telecommunication network, wherein a user plane connection between the relay capable UE and the intermediate node can be established. That particular user plane connection is used for conveying the registration message which originates from the remote UE.

Typically, a user plane connection is used for handling user traffic like voice and/or data, and a control plane connection handles the actual signalling, i.e. control messages, between nodes in the telecommunication network. In the present disclosure, it is the user plane connection that is associated with the relay capable UE that is actually used for signalling purposes.

The advantage of the above is that the remote UE does no longer need an initial, direct, connection to the telecommunication network before establishing a relayed connection, via the relay capable UE, to the telecommunication network. More specifically, the registration message for registering, or attaching, the remote UE to the telecommunication network may be routed to the telecommunication network via the relay capable UE. As such, an initial direct connection between the remote UE and the access network becomes superfluous.

According to the present disclosure, an intermediate node is introduced for supporting the establishment of a relayed connection between the remote UE and the telecommunication network. The intermediate node is able to support a user plane connection between the relay capable UE and itself.

It is noted that for a non-relayed connection, the access node, for example a 4G eNodeB or a 5G gNB, forwards the registration message via the control plane directly to the Mobility Management Function, for example the 4G Mobility Management Entity (MME) or the 5G Access and Mobility Management Function (AMF). The intermediate node is introduced such that a user plane connection with the relay capable UE and a control plane connection to the Mobility Management Function can be established. The intermediate node may then receive the registration message from the remote UE via the user plane connection to the relay capable UE, and may forward the registration message to the Mobility Management Function using the control plane.

The intermediate node may be considered a proxy node which receives and relays signalling messages between the remote UE and the Mobility Management Function. Such an intermediate node may be considered a device-to-device functionality node. It may also perform its own access authorization procedures in order to verify whether the remote UE is allowed to be registered to the network.

The functionality of the intermediate node may also be implemented in nodes already existing in the telecommunication network, for example a Packet Data Network Gateway (P-GW) node, a 5G User Plane Function (UPF), an evolved Packet Data Gateway node, a Trusted Wireless Access Gateway, a ProSe function or a Non-3GPP Interworking Function.

The Mobility Management Function may be a Mobility Management Entity (MME) node in fourth Generation (4G) telecommunication networks or an Access and Mobility Management Function (AMF) node in fifth Generation (5G) telecommunication networks.

In order to discover the relay capable UE, the remote UE may perform a ProSe discovery method. The present disclosure is especially suitable for situations in which the remote UE discovers the relay capable UE using particular types of radio resources, like WiFi or WiFi Neighbourhood Area Network (Wi-Fi NAN). In such situations, the remote UE may not have, or at least may not need, a direct connection with the access network. In such case, the remote UE is still able to establish a connection to the telecommunication network by using the relay capable UE for forwarding the registration message. The present disclosure may also apply to any future 5G version of direct device-to-device discovery and communication.

In an embodiment, said registration message comprises an identification of an identity of said remote UE, wherein said method further comprises the step of translating said identification of said identity of said remote UE to said identity of said remote UE and inserting said identity of said remote UE into said registration message to be forwarded to said Mobility Management Function.

It was found that the registration message that is sent from the remote UE via the relay capable UE to the telecommunication network may comprise sensitive information. One of the risks involved in a relaying concept is that the relay capable UE is able to intercept such sensitive information from the registration message. Such sensitive information is, for example, the permanent identity of the remote UE such as the International Mobile Subscription Identifier (IMSI).

In order to overcome such potential risks, a temporary identification of the identity of the remote UE may be introduced. Such an identification is, for example, a token which uniquely refers to the specific identity of the remote UE. In such a case, it is no longer needed to include the specific permanent identity of the remote UE, i.e. the IMSI, in the registration message. It is sufficient to include the temporary identification of the identity of the remote UE in the registration message.

Here, the intermediate node should be able to translate the temporary identification of the identity of the remote UE into the identity of the remote UE itself. This can be accomplished in several ways.

As a first option, the remote UE may, previously, connect to the intermediate node via another network, i.e. not via the relay capable UE, to retrieve or generate the identification of the identity of the remote UE. The remote UE may, for example, send its identity to the intermediate node, and the intermediate node may generate and provide an identification of the identity of the remote UE back to the remote UE again. In a subsequent registration message, the remote UE may simply use the identification of the identity of the remote UE as the identification can be translated, by the intermediate node, back to the identity of the remote UE itself.

As a second option, a user may manually provision the identity of the remote UE in the intermediate node. The intermediate node may then generate the identification of the identity of the remote UE. The user may then, subsequently, provision that particular identification in the remote UE.

The advantage of the above is that the relay capable UE is not able to translate the identification of the identity of the remote UE to the actual identity of the remote UE, thereby improving the security and safety aspects of the signalling mechanism.

In an embodiment, said method comprises an initial step of establishing a secure connection between said remote UE and said intermediate node over said relay capable UE.

As mentioned above, there may be a potential security risk in that the relay capable UE may be able to intercept sensitive information which is included in the registration message.

As an alternative, or as an addition to the solution provided above, a secure connection between the remote UE and the intermediate node over the relay capable UE may be established initially. Such a secure connection may then be used for conveying the registration message.

Such a secure connection may be based on Transport Layer Security (TLS) IPSec associations, or anything alike.

The advantage of the above is that the relay capable UE is not able to intercept the registration message, as the message is being conveyed over a secure connection between the remote UE and the intermediate node.

In a further embodiment, said method comprises the steps of receiving, by said remote UE, from said relay capable UE, a tracking area identification for indicating a tracking area of said relay capable UE and inserting, by said remote UE, said tracking area identification in said registration message.

The tracking area identification is, for example, the Tracking Area Code, the Routing Area Identification or the Location Area Identification.

The tracking area identification may be requested by transmitting, by the remote UE towards the relay capable UE, a Cell ID Announcement Request as, for example, specified in TS 23.303 clause 5.4.4.5. The relay capable UE will then respond with a Cell ID Announcement Response message, which Response message comprises a Tracking Area Code.

The tracking area identification may, alternatively, be inserted in the registration message by the relay capable UE. That is, the remote UE may send the registration message directly to the relay capable UE, and the relay capable UE may insert its tracking area identification in that particular message before forwarding the registration message to the intermediate node.

The advantage of adding the tracking area identification is that the Mobility Management Function is made aware of the area, i.e. location, of the remote UE within the telecommunication network. As such, the Mobility Management Function is able to "find" the remote UE in the telecommunication network by using the tracking area identification and is therefore especially useful for situations in which traffic is heading towards the remote UE, i.e. in the downlink situation.

In another embodiment, said method further comprises the step of conveying subsequent signalling messages between said remote UE and said Mobility Management Function using said established signalling connection by transmitting said subsequent signalling messages over a control plane between said relay capable UE and said Mobility Management Function. Subsequent messages between the remote UE and the Mobility Management Function do no longer need to be transferred over the user plane between the relay capable UE and the intermediate node once the signalling connection for the remote UE has been established.

These subsequent messages may then be transmitted over a control plane between the relay capable UE and the Mobility Management Function.

The advantage of the above described embodiment is that a more conventional connection between the remote UE and the Mobility Management Function may be utilized for transferring the subsequent signalling messages for, for example, session management or mobility management. According to the present disclosure, messages related to the initial registration of the remote UE are conveyed over the user plane connection of the relay capable UE. Subsequent messages from, or to, the remote UE may use a conventional signalling path, and thus will not travel over the user plane.

In an example, the relay capable UE may have a user plane connection to the intermediate node via non-3GPP access like Wi-Fi, Bluetooth, or a fixed connection. A user plane connection may also be plain IP connectivity, or another type of point to point connectivity like Point to Point Tunnelling Protocol or Generic Routing Encapsulation tunnels, a non-IP Public Data Network, PDN, connection, a PDN connection with CIoT Control Plane Optimization as specified in TS 23.401 clause 5.3.4B, or anything alike. The benefit of this is supporting relaying via different access networks, especially since the 5G core network architecture is envisioned to support access via many different access network technologies.

In a second aspect of the present disclosure, there is provided an intermediate node arranged for supporting establishment of a signalling connection between a remote UE and a telecommunication network via a relay capable UE, wherein said intermediate node is arranged for having user plane connectivity between said relay capable UE and said intermediate node, said intermediate node comprising a receiver, a transmitter, and at least one processor configured to use said receiver for receiving a registration message over a user plane, which registration message is forwarded by said relay capable UE and originating from said remote UE for registering said remote UE to said telecommunication network, use said transmitter for forwarding said registration message to a Mobility Management Function comprised by said telecommunication network, use said receiver for receiving a registration accept message from said mobility Management Function for accepting registration of said remote UE to said telecommunication network, and use said transmitter for forwarding said registration accept message to said remote UE via said relay capable UE.

The expressions, i.e. the wording, of the different aspects comprised by the method and devices according to the present disclosure should not be taken literally. The wording of the aspects is merely chosen to accurately express the rationale behind the actual functioning of the aspects.

In accordance with the present disclosure, different aspects applicable to the above mentioned examples of the methods in a first aspect of the invention, including the advantages thereof, correspond to the aspects which are applicable to methods of the second aspect or the third aspect of the invention.

As mentioned above, the intermediate node may be any of a Packet Data Network Gateway (P-GW) node, a ProSe function, a User Plane Function (UPF), an evolved Packet Data Gateway node, non-3GPP InterWorking Function, N3IWF, or a Trusted Wireless Access Gateway.

It was found that an intermediate node, i.e. a node between the Mobility Management Function and the relay capable UE, may be utilized, because the relay capable UE may need to transmit the registration message over a user plane. Typically, it may not be possible to transfer the registration message directly from the relay capable UE to the Mobility Management Function as the Mobility Management Function may not support that particular functionality.

The intermediate node may then function as a node that is capable of having user plane connectivity towards the relay capable UE, and that is capable of interacting with the Mobility Management Function.

In an embodiment, said registration message comprises an identification of an identity of said remote UE, wherein said at least one processor is further arranged for translating said identification of said identity of said remote UE to said identity of said remote UE, and for inserting said identity of said remote UE in said registration message to be forwarded to said Mobility Management Function.

In an embodiment, said at least one processor is further arranged for establishing a secure connection between said remote UE and said intermediate node over said relay capable UE.

In a third aspect, there is provided a remote UE arranged for establishing a signalling connection to a telecommunication network via a relay capable UE, said remote UE comprising a receiver, a transmitter, and at least one processor configured to discover said relay capable UE and to establish a direct connection to said relay capable UE, to use said transmitter for transmitting a registration message to said intermediate node, via said relay capable UE, for registering said remote UE in said telecommunication network, to use said receiver for receiving an registration accept message for accepting registration of said remote UE to said telecommunication network.

The remote UE does not need to have its own, direct, connection to the telecommunication network. That is, the remote UE does not need to be connected to an access network.

The registration message is sent by the remote UE directly to the relay capable UE, even if the remote UE was to be connected to the telecommunication network. The registration message may be sent using Wi-Fi technology, Bluetooth technology, Zigbee technology, Long Term Evolution (LTE) direct technology, future 5G direct radio technology, or anything alike.

The present disclosure may be applicable for different types of telecommunication network, like the fourth Generation (4G) telecommunication network and the fifth Generation (5G) telecommunication network. For example, in some parts of the present disclosure there is referred to the evolved node B (eNB) which is known in 4G telecommunication networks as the access node for a UE. A same reasoning may be valid for the gNodeB (next Generation Node B, gNB) in 5G telecommunication networks. Similarly, the Mobility Management Function may be referred to as a Mobility Management Entity (MME) in 4G telecommunication networks and/or an Access and Mobility Management Function (AMF) in 5G telecommunication networks. Further, the Packet gateway (P-GW) and Serving gateway (S-GW) in 4G telecommunication networks may be referred to as User Plane Function (UPF) in 5G telecommunication networks.

As such, the registration message may be an attach request message or a registration request message or anything like.

In an embodiment, the at least one processor is further configured to insert, in said registration message, an identification of said identity of said remote UE, which identification translates to an identity of said remote UE.

In an embodiment, the at least one processor is further configured for establishing a secure connection between said remote UE and said intermediate node over said relay capable UE.

In an embodiment, the at least one processor is further configured to use said receiver for receiving, from said relay capable UE, a tracking area identification for indicating a tracking area of said relay capable UE, and insert said tracking area identification in said registration message.

In a fourth aspect, there is provided a relay capable UE for acting as a relay for a remote UE towards a telecommunication network, said relay capable UE comprising a receiver, a transmitter, and at least one processor configured to establish a direct connection to said remote UE, to use said receiver for receiving a signalling message from said remote UE, wherein said signalling message is intended for a Mobility Management Function comprised by said telecommunication network, to determine that said signalling message is to be transmitted to an intermediate node in said telecommunication network over a user plane associated with said relay capable UE, and to use said transmitter for transmitting said signalling message over said user plane to said intermediate node.

The relay capable UE is arranged to determine that a signalling message received from the remote UE is to be transmitted to the intermediate node in the telecommunication network over a user plane.

For example, a registration message, being a specific signalling message, originating from the remote UE is to be transmitted over the user plane as that particular message is intended to establish a signalling connection between the Mobility Management Function and the remote UE.

Subsequent signalling messages, sent from the remote UE to the relay capable UE, may be transmitted over a control plane between the relay capable UE and the Mobility Management Function once the signalling connection has been established.

The relay capable UE may, for example, determine the specific type of signalling message that it received from the remote UE. A registration message may be sent to the intermediate node over the user plane and any other signalling message may be sent directly to the Mobility Management Function over the control plane.

In a fifth aspect, there is provided a non-transitory computer-readable storage medium, comprising instructions which, when executed on at least one processor, cause the at least one processor to carry out the method according to any of methods as disclosed above.

Any type of computer readable storage medium may be utilized. The computer readable storage medium may be, for example, but not limited to, an electronic, magnetic, optical, electromagnetic, infrared, or semiconductor system, apparatus, or device, or any suitable combination of the foregoing. More specific examples of the computer readable storage medium would include the following: an electrical connection having one or more wires, a portable computer diskette, a hard disk, a random access memory, RAM, a read-only memory, ROM, an erasable programmable read-only memory, a portable compact disc read-only memory, an optical storage device, a magnetic storage device, or any suitable combination of the foregoing.

In a sixth aspect, there is provided a telecommunication network for supporting establishment of a direct connection between a remote UE and said telecommunication network via a relay capable UE, wherein said relay capable UE has established user plane connectivity to an intermediate node comprised by said telecommunication network and is arranged for supporting establishment of said direct connection for said remote UE, said telecommunication network comprising an intermediate node in accordance with any of the examples as provided above.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION

It is noted that aspects that have the same, or similar, meaning across the figures have been referenced with the same reference numeral to increase the readability.

Figure 1:
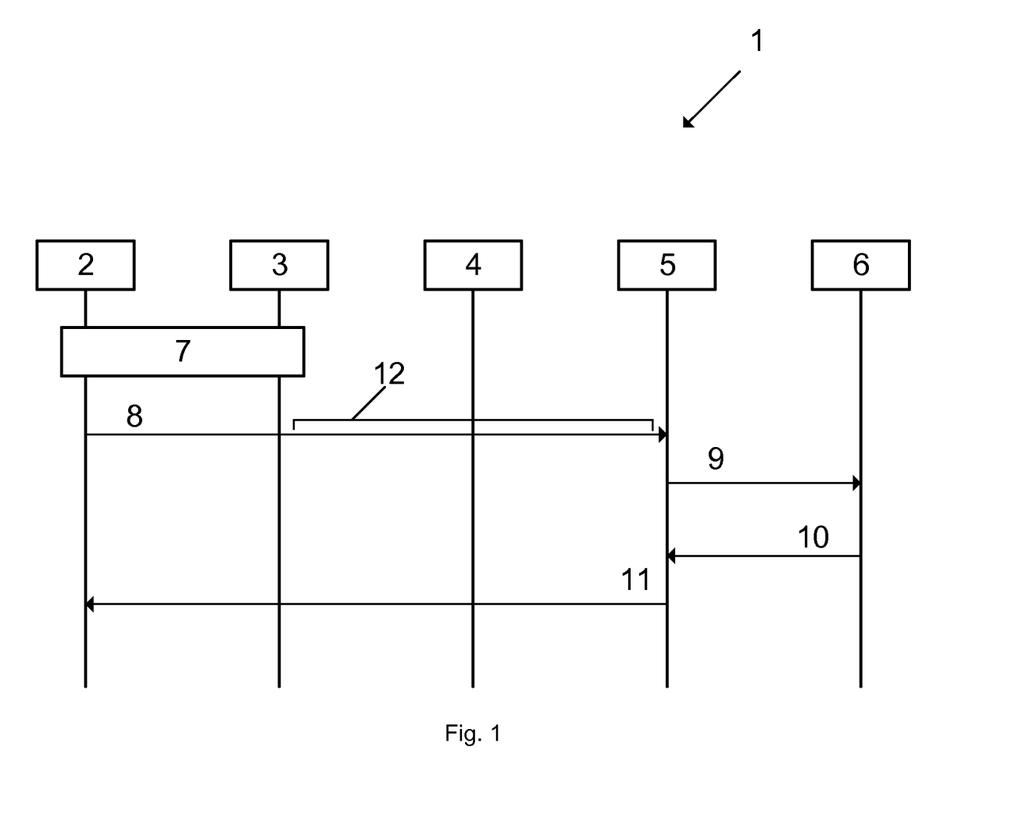
FIG. 1 shows a signalling diagram in which a remote User Equipment, UE, requests registration in the telecommunication network via a relay capable UE.

FIG. 1 shows a signalling diagram 1 in which a remote User Equipment, UE, 2 requests registration in the telecommunication network via a relay capable UE 3, in accordance with an embodiment of the present invention.

As mentioned in the background section, a method for establishing a relayed connection for a remote UE is already known in the art. Such a method requires the network to first authorize the remote UE and the network needs to configure and control the use of radio resources for the link between the Remote UE and the Relay capable UE.

One of the disadvantages of the above described known method is that the remote UE needs to have had a previous connection to the network before initiating establishment of a relayed connection.

The signalling diagram 1 shown in FIG. 1 depicts a method in which a relayed connection for a remote UE 2 can be established, without the need for the remote UE 2 to have had a previous connection to the network. The corresponding method steps are elucidated in more detail hereafter.

First, the remote UE 2 may initiate a device-to-device proximity discovery procedure 7 using WiFi Aware, or other types of proximity discovery procedures, to find and setup a direct connection to the relay capable UE 3.

Second, the remote UE 2 may transmit a registration message 8 to an intermediate node 5, via said relay capable UE 3 over said established direct connection, for registering said remote UE 2 in said telecommunication network.

The intermediate node 5 is arranged to exchange messages with the relay capable UE 3 over a user plane 12, and is arranged to exchange messages with a Mobility Management Function 6 over a control plane. As such, the intermediate node 5 may act as a proxy for the signalling messages exchanged between the remote UE 2 and the Mobility Management Function 6. The relay capable UE 3, thus, has established user plane connectivity to the intermediate node 5, and the registration message 8 is forwarded, by the relay capable UE 3, over the user plane, to the intermediate node 5.

Third, the intermediate node 5 may forward the registration message 9 to the core network of the telecommunication network, more specifically to a Mobility Management Function comprised by the telecommunication network.

Fourth, the Mobility Management Function may transmit a registration accept message 10 to the intermediate node 5 for accepting registration of the remote UE 2 to the telecommunication network.

Fifth, the intermediate 5 node may forward the registration accept message 11 to the remote UE 2 via the relay capable UE 3.

The inventors have found that a previous, direct, connection of the remote UE 2 to the telecommunication network is no longer required in case the user plane connectivity 12 of the relay capable UE 3 to the intermediate node 5 is utilized for conveying the registration message originating from the remote UE 2.

The presented method has the advantage that the remote UE 2 does not need to have had a previous connection to the network. This, however, does not mean that the presented method is excluded for remote UEs that have had a previous connection to the network.

Further, it is noted that the presented method enables the use of other types of discovery procedures 7 for the remote UE 2. Some radio resources, like WiFi, WiFi NAN, or the like, do not need a previous connection from the remote UE 2 to the core network. Using such technologies, a direct connection between the remote UE 2 and the relay capable UE 3 may be established without contacting the access network or the core network. As such, the presented method is especially advantageous when considering non-3GPP radio technologies for discovery and communication between the remote UE 2 and the relay capable UE 3.

The telecommunication network may comprise a core network and an access network for obtaining access to the core network. The telecommunication network may be based on a fourth Generation network, wherein the core network is the Evolved Packet Core, EPC, and wherein the access network is the Evolved UMTS Terrestrial Radio Access Network, E-UTRAN. In another option, the telecommunication network may be based on a fifth Generation network, wherein the core network is the 5G Core network, 5GCN, and wherein the access network is the 5G Access Network, 5GAN, and wherein the access node is the gNB.

In the present scenario, it is assumed that the relay capable UE 3 may already be registered in the telecommunication network and may have an active Public Data Network, PDN, connection. The relay capable UE 3 may be connected to the core network via an access node 4, for example the Evolved Node B, eNB 4.

The present disclosure describes a method of establishing a relayed connection between the remote UE 2 and the telecommunication network, wherein the remote UE 2 sends a registration message 8 for registering the remote UE 2 in the telecommunication network. It is noted that such a registration message may be based on an attach request message as known in the art.

It was found that the introduction of an intermediate node 5 is beneficial as, typically, the Mobility Management Function 6 does typically not support end-to-end user plane connectivity. As such, the registration message may be sent, by the relay capable UE 3, over a user plane connection 12, for example a Transmission Control Protocol, TCP, session, to the intermediate node 5, and the intermediate node 5 may forward 9 the registration message over a control plane to the Mobility Management Function 6.

As mentioned previously, one of the intrinsic issues with using a relay capable UE 3 is that the relay capable UE 3 may intercept any messages exchanged between the remote UE 2 and the telecommunication network. At least two scenarios were found to mitigate the risk that the relay capable UE can intercept, and interpret particular content of the messages exchanged.

Figure 2:
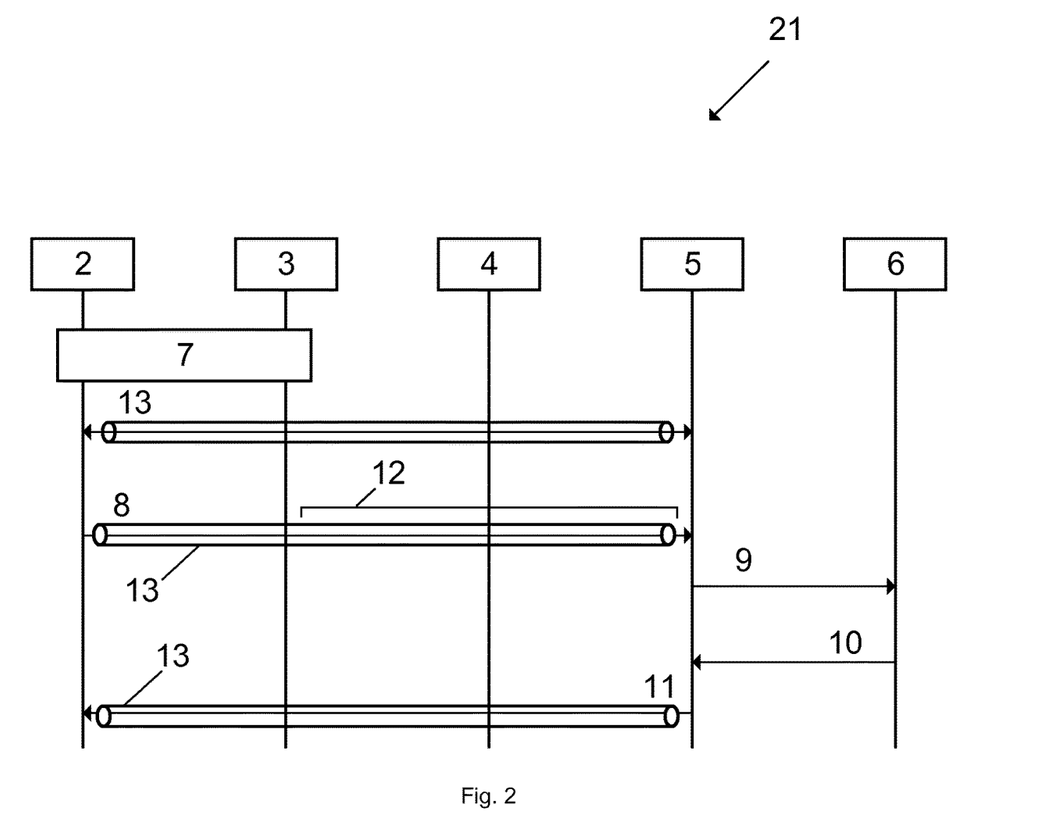
FIG. 2 shows another signalling diagram in which the remote UE requests registration in the telecommunication network via the relay capable UE.

As a first option, it was found to establish a secure connection between the remote UE 2 and the intermediate node 5, which is explained in more detail with reference to the signalling diagram 21 shown in FIG. 2.

Here, the communication flows between the remote UE 2 and the telecommunication network are the same as the communication flows as depicted in FIG. 1. The difference is that, first, a security association 13 is established between the remote UE 2 and the intermediate node 5, via the relay capable UE 3, before the registration message is sent by the remote UE 2. The registration message is then sent over the established secure connection 13. The secure connection 13 may represent a secure tunnel between the remote UE 2 and the intermediate node 5. The relay capable UE 3 may forward any IP packets belonging to this secure tunnel, via the user plane 12, to the intermediate node 5.

The secure connection 13 between the remote UE 2 and the intermediate node 5 may be established using known mechanisms like Internet Protocol Security, IPSec, Transport Layer Security, TLS, or anything alike.

The registration message may then comprise the identity of he remote UE, e.g. the IMSI, or any other sensitive information, as the message is sent over the secure connection such that the relay capable UE 3 is not able to intercept the message and view its content.

Figure 3:
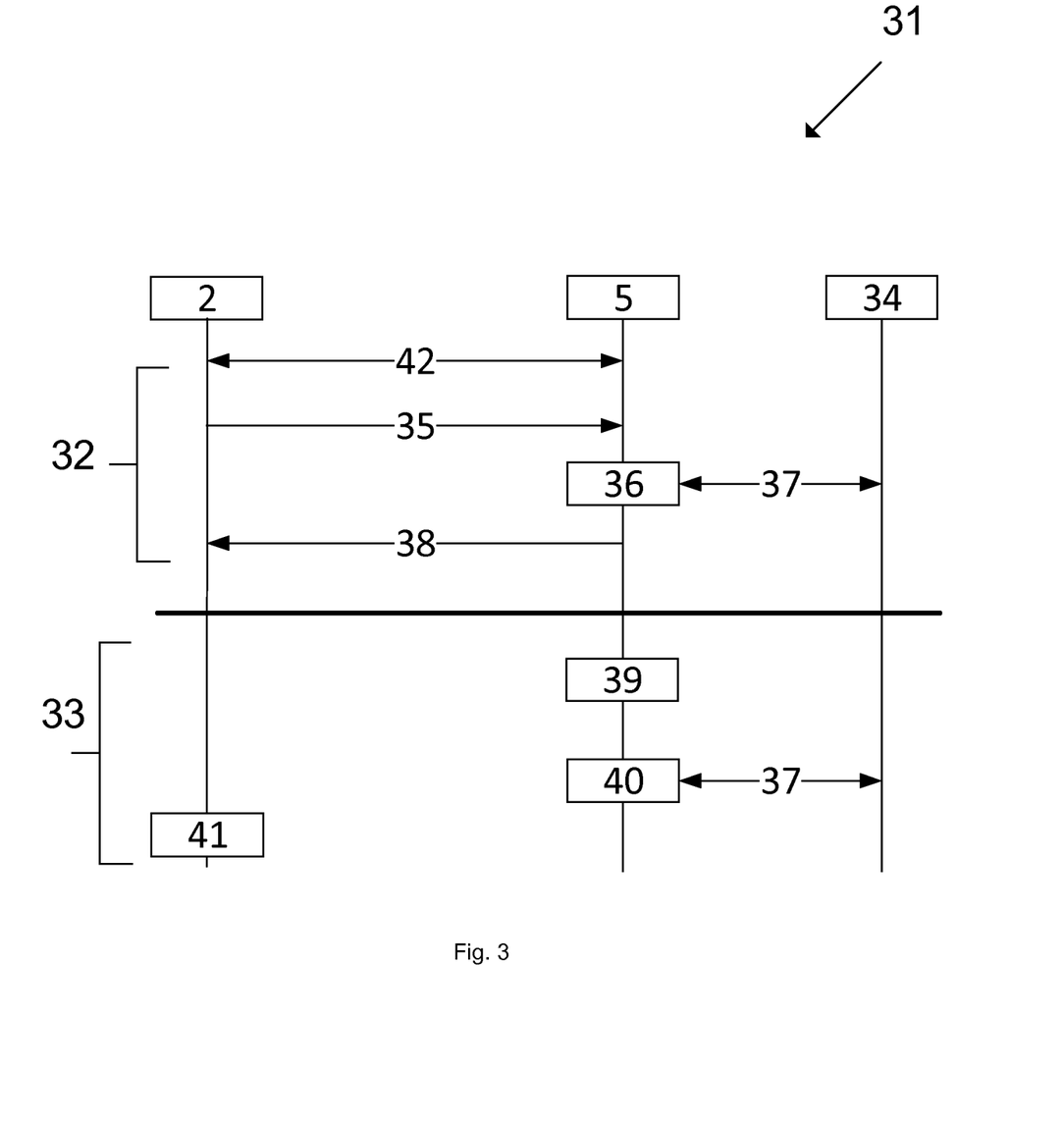
FIG. 3 shows a signalling diagram in which two methods of retrieving an identification of an identity of said remote UE are disclosed.

FIG. 3 shows signalling diagrams 31 directed to a second option. The second option may have two different implementations. A first implementation is indicated with reference numeral 32. A second implementation is indicated with reference numeral 33.

The generic idea of the second option is to include an identification of an identity of said remote UE 2, e.g. an access token, by the remote UE in the registration message. In such a case, the intermediate node 5 should be able to translate the identification of the identity of the remote UE 2, i.e. the access token, to the identity of the remote UE 2 itself. The access token may thus translate into an identity, e.g. the International Mobile Subscriber Identity, IMSI, of the remote UE 2.

The intermediate node 5 may then need to be aware of the specific translations.

Using an access token as explained above, the relay capable UE 3 may still be able to intercept and view the content of the messages exchanged between the remote UE 2 and the telecommunication network, but the relay capable UE 3 is not able to retrieve any sensitive information. More specifically, the relay capable UE 3 is not able to retrieve the IMSI as the IMSI is not part of the registration message. The relay capable UE 3 is not able to translate the identification of the identity of the remote UE 2, i.e. the access token, to the IMSI as the relay capable UE 3 is not aware of how to perform such translations.

The first implementation 32 assumes that the remote UE 2 is able to contact the intermediate node 5 via any type of access network. The remote UE 2 may, for example, have a regular, direct, connection to the core network via an E-UTRAN, or may connect to the core network in any other way.

In a first step 42, a secure connection may be established between the remote UE 2 and the intermediate node 5. The secure connection 42 is used for transmitting 35 a token request message for requesting an access token, i.e. an identification of the identity of the remote UE 2, that translates into the identity of the remote UE 2.

Upon receipt of the token request message, the intermediate node 5 may fetch 37 the subscription details, i.e. the IMSI, from a Home Subscriber Server, HSS 34.

The intermediate node 5 may then generate an access token 36 based on the IMSI that it received from the HSS 34, and the access token is then transmitted 38, over the secure connection, towards the remote UE 2. The remote UE 2 may then store the access token 36, for example until it later needs to perform a registration via a relay capable UE. The remote UE 2 is then able to incorporate the access token in the registration message as the intermediate node 5 is able to translate the access token to the IMSI of the remote UE 2.

The second implementation 33 assumes that a user provisions the access token manually. That is, a subscription identifier, for example the IMSI, the Integrated Circuit Card Identifier, ICCID, or a username/password combination, for the remote UE 2 may be provisioned 39 directly into the intermediate node 5, for example via a web interface or anything alike. The intermediate node 5 may then fetch 37 subscription details from a HSS 34 based on the received subscription identifier, and may generate 40 an access token based on the details received.

Finally, the generated 40 access token is displayed to the user, and the user may provision 41, for example store, the access token directly in the remote UE 2.

Figure 4:
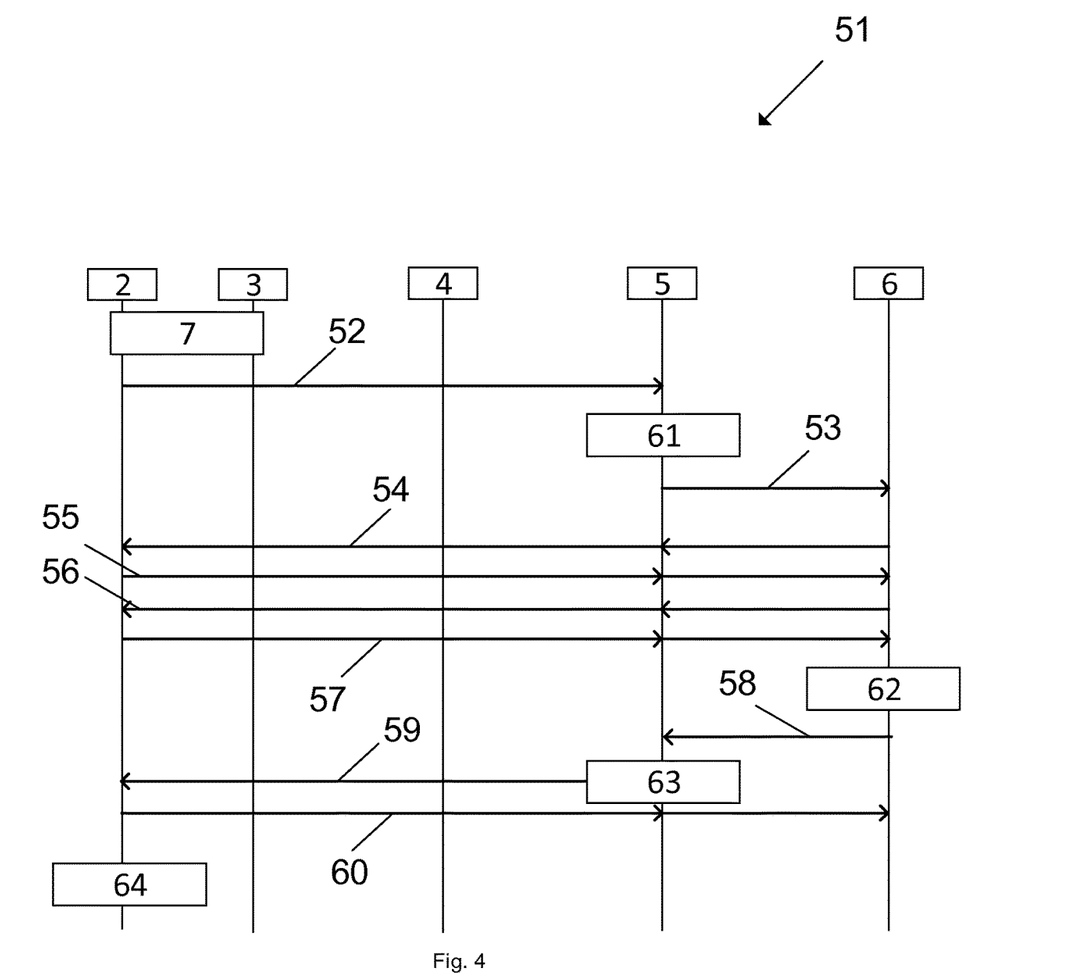
FIG. 4 shows a flow diagram illustrating an example of method steps performed in accordance with the present disclosure.

FIG. 4 shows a flow diagram illustrating an example 51 of method steps performed in accordance with the present disclosure. The method steps are elucidated in more detail hereafter.

The remote UE 2 may initiate a device-to-device proximity discovery procedure 7 using WiFi Aware, or other types of proximity discovery procedures, to find and setup a connection to the relay capable UE 3. The relay capable UE 3 may be connected to an access node 4 for accessing the core network of the telecommunication network. The access node 4 may, for example, be the Evolved Node B, eNB 4.

One possibility is to use ProSe Discovery and One-to-one connection setup as is specified in 3GPP TS 23.303. Once completed, the remote UE 2 may initiate a Cell ID Announcement Request also as specified in TS 23.303. With the Cell ID Announcement Response message, the relay capable UE 3 may inform the Remote UE 2 about the tracking area identification, for example the Tracking Area Code, TAC, and/or EUTRAN Cell Global ID it is connected to.

The Remote UE 2 may then send a registration message 52, for example an attach request, to the intermediate node 5, for example a ProSe Function, for requesting registration in the telecommunication network. This message may include the identification of the identity of the remote UE 2 provisioned manually or retrieved from the ProSe Function, as explained with respect to FIG. 3. The message is sent via the relay capable UE's user plane.

The intermediate node 5 may find 61 the UE context based on the received identification of the identity of the remote UE 2, and may obtain the IMSI using the identification of the identity of the remote UE 2 present in the registration message 52. Further, the intermediate node 5 may perform ProSe service authorization for the remote UE 2.

The intermediate node 5 may forward the registration message 53 to the Mobility Management Function 6, for example the Mobility Management Entity or the Access and Mobility management function, including the obtained IMSI. Such a registration message 53, for example an attach message, may be based on the attach cases as defined in TS 23.401, wherein, additionally, the attach type may be set to "relayed" and wherein the message comprises the tracking area identification.

The authentication and key agreement may be performed 54, 55 in the same way as during a regular attach procedure as defined in TS 23.401. The difference may be that corresponding messages are sent via the intermediate node 5 in both directions.

The Non Access Stratum, NAS, Security Mode procedure may also be performed 56, 57 in the same way as during the regular attach procedure defined in TS 23.401. Again, the difference is that corresponding messages are sent via the intermediate node 5 in both directions.

The Mobility Management Function 6 may initiate 62 a new session creation towards a Serving Gateway, SGW, as defined in TS 23.401. However, based on the attach type being "relayed", the Mobility Management Function 6 may not initiate a context setup towards the radio access network as in the conventional attach procedure. The remote UE 2 may thus remain in ECM-IDLE state.

The Mobility Management Function 6 may accept the registration request by sending 58 an attach accept message to the intermediate node 5, which attach accept message may include a new identifier for identifying the remote user equipment 2 to the telecommunication network, for example a Globally Unique Temporary ID, GUTI.

The intermediate node 5 may then generate 63 a new identification of the identity of the remote UE 2, which may be used in a subsequent attach procedure and, and may send 59 an attach accept message to the remote UE 2 including its new identification and new GUTI. It is also possible that the intermediate node 5 does not generate a new identification in every remote attach procedure, but after several procedures. It is also possible that the identification is updated in time intervals.

The remote UE 2 may complete the establishment of a corresponding NAS signalling context and may finish the procedure by sending 60 an attach complete message to the Mobility Management Function 6, via the intermediate node 5.

In case the remote UE 2 needs user plane connectivity, it may initiate 64 a NAS Service Request to the Mobility Management Function via the control plane, through the relay capable UE 3 and its serving access node 4.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A method of establishing a signalling connection between a remote User Equipment, UE, and a telecommunication network via a relay capable UE, said method comprising:
    an intermediate node comprised by said telecommunication network receiving a registration message from said relay capable UE over an established user plane connection between said relay capable UE and said intermediate node via an access node in said telecommunication network, said registration message forwarded by said relay capable UE and originating from said remote UE for registering said remote UE to said telecommunication network, said relay capable UE being arranged for supporting establishment of said signalling connection for said remote UE;
    after receiving said registration message, said intermediate node forwarding said registration message to a Mobility Management Function comprised by said telecommunication network;
    said intermediate node receiving a registration accept message from said Mobility Management Function for accepting registration of said remote UE to said telecommunication network, and forwarding said registration accept message to said remote UE via said relay capable UE.

2. A method according to claim 1, wherein said registration message comprises an identification of an identity of said remote UE, wherein said method further comprises:
    translating said identification of said identity of said remote UE to said identity of said remote UE and inserting said identity of said remote UE into said registration message to be forwarded to said Mobility Management Function.

3. A method according to claim 1, wherein said method comprises:
    establishing a secure connection between said remote UE and said intermediate node over said relay capable UE.

4. A method according to claim 1, wherein said method comprises:
    receiving, by said remote UE, from said relay capable UE, a tracking area identification for indicating a tracking area of said relay capable UE;
    inserting, by said remote UE, said tracking area identification in said registration message.

5. A method according to claim 1, wherein said method further comprises:
    conveying subsequent signalling messages between said remote UE and said Mobility Management Function using said established signalling connection by transmitting said subsequent signalling messages over a control plane between said relay capable UE and said Mobility Management Function.

6. A non-transitory computer-readable storage medium, comprising instructions which, when executed on at least one processor, cause the at least one processor to carry out the method according to claim 1.

7. An intermediate node comprising:
    a receiver;
    a transmitter;
    at least one processor configured to support establishment of a signalling connection between a remote UE and a telecommunication network via a relay capable UE by using said receiver for receiving a registration message from said relay capable UE over an established user plane connection between said relay capable UE and said intermediate node via an access node in said telecommunication network, which registration message is forwarded by said relay capable UE and originating from said remote UE for registering said remote UE to said telecommunication network;
    after receiving said registration message, using said transmitter for forwarding said registration message to a Mobility Management Function comprised by said telecommunication network;
    using said receiver for receiving a registration accept message from said mobility Management Function for accepting registration of said remote UE to said telecommunication network, and
    using said transmitter for forwarding said registration accept message to said remote UE via said relay capable UE.

8. An intermediate node in accordance with claim 7, wherein said registration message comprises an identification of an identity of said remote UE, wherein said at least one processor is further arranged for translating said identification of said identity of said remote UE to said identity of said remote UE, and for inserting said identity of said remote UE in said registration message to be forwarded to said Mobility Management Function.

9. An intermediate node in accordance with claim 7, wherein said at least one processor is further arranged for establishing a secure connection between said remote UE and said intermediate node over said relay capable UE.

10. A relay capable User Equipment, UE, comprising:
a transmitter;
at least one processor configured to act as a relay for a remote UE towards a telecommunication network by establishing a direct connection to said remote UE;
using said receiver for receiving a registration message from said remote UE, said registration message for registering said remote UE to said telecommunication network, wherein said registration message is intended for a Mobility Management Function comprised by said telecommunication network;
determining that said registration message is to be transmitted to an intermediate node in said telecommunication network over an established user plane connection between said relay capable UE and said intermediate node via an access node in said telecommunication network;
using said transmitter for transmitting said registration message over said user plane connection to said intermediate node.

11. A telecommunication network comprising:
a remote User Equipment, UE,
a relay capable UE,
an access node,
and an intermediate node,
wherein said relay capable UE has an established user plane connection to said intermediate node via said access node and is arranged for supporting establishment of a direct connection for said remote UE,
wherein said intermediate node is arranged for supporting establishment of a signalling connection between said remote UE and said telecommunication network via said relay capable UE,
wherein said intermediate node comprises:
a receiver;
a transmitter;
at least one processor configured to
use said receiver for receiving a registration message over said user plane connection, which registration message is forwarded by said relay capable UE and originating from said remote UE for registering said remote UE to said telecommunication network;
use said transmitter for forwarding said registration message to a Mobility Management Function comprised by said telecommunication network;
use said receiver for receiving a registration accept message from said mobility Management Function for accepting registration of said remote UE to said telecommunication network, and
use said transmitter for forwarding said registration accept message to said remote UE via said relay capable UE.

* * * * *